Patented July 23, 1946

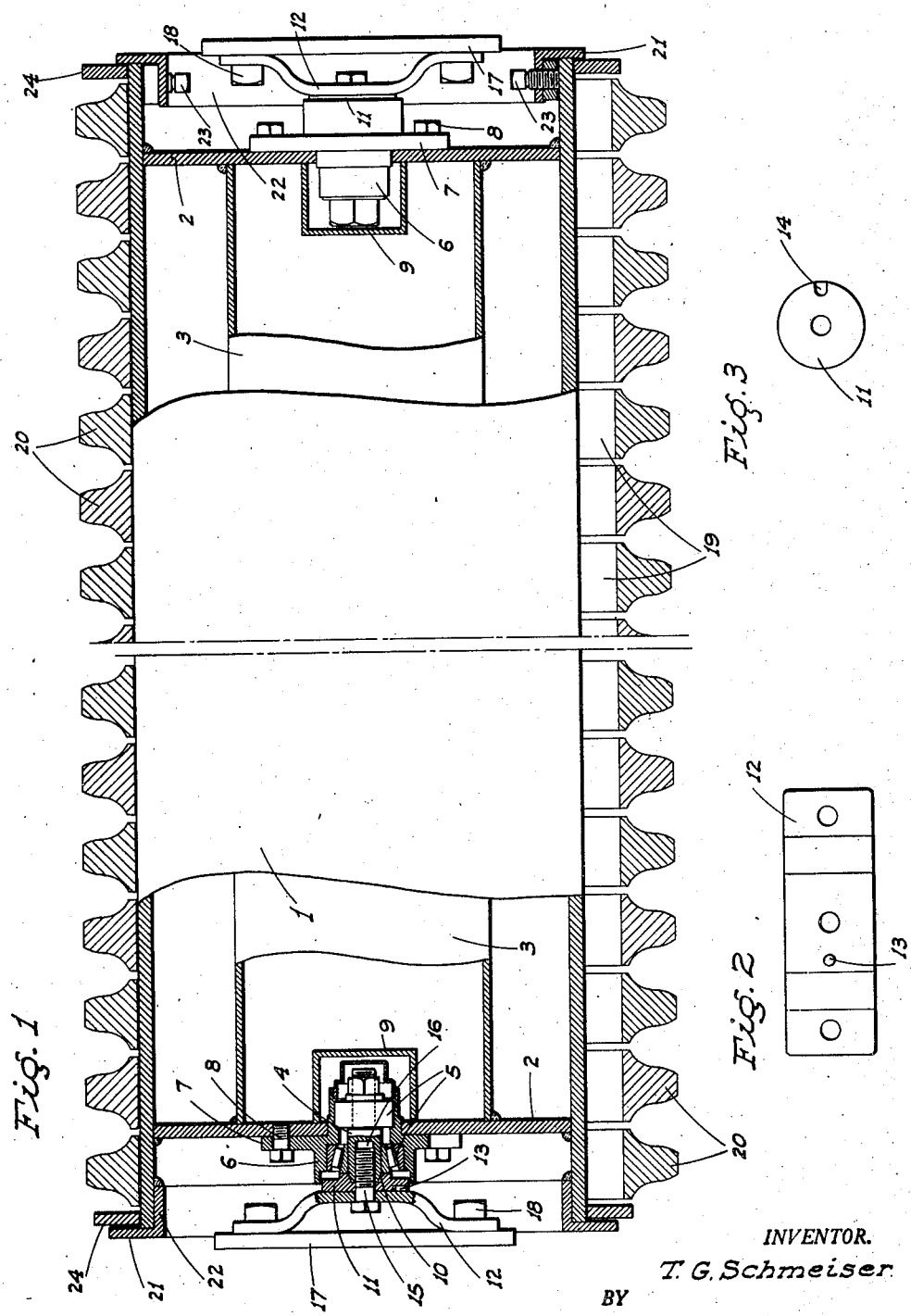

2,404,535

UNITED STATES PATENT OFFICE 2,404,535

BEARING MOUNTING FOR EARTHWORKING ROLLER UNITS

Theodore G. Schmeiser, Fresno, Calif.

Application February 27, 1945, Serial No. 579,922

2 Claims. (Cl. 308—22)

This invention relates in general to an earth working implement, and in particular the invention is directed to, and it is an object to provide, an improved toothed roller unit adapted for use to pulverize and pack the soil in connection with the preparation and maintenance of seed beds, road and airport construction, and the like.

The present invention represents a modification of the earth working roller unit shown in my co-pending application entitled Agricultural implement, Serial No. 534,570, filed May 8, 1944, and wherein the disclosed roller unit includes a transversely extending draft cylinder which carries, in radially loose-play relation, a plurality of toothed, soil pulverizing and compacting rings.

Another object of the present invention is to provide an earth working roller unit which includes a heavy-duty, ring supporting draft cylinder of novel design.

A further object is to provide an earth working roller unit of the type described which is provided with a unique wear ring assembly which prevents the endmost earth working rings on the draft cylinder from running against and damaging the retaining flanges on said cylinder at the ends thereof.

An additional object of the invention is to provide an earth working roller which includes novel means for detachably connecting draft frame attachment brackets to the bearing supported end spindles of the draft cylinder, whereby said brackets, and consequently the draft frame, can be detached from the roller unit without the necessity of dismounting the spindle supporting bearings.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawing similar characters of reference indicate corresponding parts in the several views:

Figure 1 is a foreshortened plan view of the roller unit, mainly in section and detached from the draft frame.

Figure 2 is an inner end view of one attachment bracket, detached.

Figure 3 is an outer end view of one attachment head, detached.

Referring now more particularly to the characters of reference on the drawing, the improved earth working roller unit which is the subject of this invention comprises an elongated heavy-duty draft cylinder 1 adapted to be disposed transversely of the direction of travel; such draft cylinder including therein adjacent but short of its ends rigidly attached heads 2. Within the draft cylinder 1 is a secondary end strengthening cylinder 3 of lesser diameter; the cylinder 3 being disposed concentric to the cylinder 1 and extending in rigidly fixed connection between the heads 2.

At each end the roller unit is provided with an axially extending spindle 4 rotatably mounted in a combination annular and thrust bearing assembly 5 enclosed within a cage 6 flanged as at 7, with said flange and cage removably secured to the corresponding head 2 by bolts 8.

Each bearing assembly and its cage projects through a central opening in the corresponding head 2, and into an inwardly extending protective cap 9.

The outer end of each spindle 4 is tapered, as at 10, and said tapered portion removably seats in a corresponding tapered socket of a circular attachment head 11, which abuts at its outer face in engagement with the central portion of a drop center attachment bracket 12. A pin 13 projects inwardly from the central portion of the attachment bracket 12 into a receiving notch 14 in the adjacent outer face of the corresponding attachment head 11, whereby to prevent relative rotation between the engaged attachment head 11 and the corresponding attachment bracket 12. A bolt 15 passes through central openings in the bracket 12 and head 11 and is thence threaded into an axial bore 16 in the spindle 14. An attachment plate or disc 17 is secured in outwardly facing relation to each attachment bracket 12 by bolts 18. Each plate or disc 17 is disposed slightly outwardly of the corresponding end of the draft cylinder 1, and is adapted for connection with the draft beams of a draft frame (not shown). By reason of the particular mounting of the above attachment members with the spindles 4, it will be seen that by removal of the bolt 15, said attachment members, together with the draft frame, may be removed from the roller unit without the necessity of dismounting said spindles from corresponding bearing assemblies 5.

The draft cylinder 1 is surrounded from end to end by a plurality of soil pulverizing and packing rings 19, each of which include a circumferential row of outwardly projecting cultivator teeth 20. The rings 19 have an internal diameter which is substantially greater than the external diameter of the draft cylinder 1 so that with advance of the roller unit the individual rings separately and independently float on the ground whereby the roller unit, from end to end thereof, conforms to ground contour and consequently produces a more effective working and packing of the soil.

The rings 19 are held against escape from the ends of the draft cylinder 1 by means of the following arrangement:

Annular flanges 21 are disposed at the ends and project radially out from the draft cylinder. Each annular flange includes a circular, inwardly projecting attachment collar 22; the collar at one end of the cylinder being welded to the latter, while the collar at the other end of the cylinder removably secures the corresponding flange 21 in place by means of a plurality of circumferentially spaced set screws 23.

The cylinder 1 carries, between each flange 21 and the adjacent earth working ring 19, a retaining and wear ring 24 turnable on said cylinder, the retaining and wear rings 24 being of an external diameter greater than the internal diameter of the rings 19, but lesser than the external diameter of the latter. It will thus be seen that the flanges 21 retain the rings 24 on the cylinder, and said latter rings in turn retain the earth working rings 19 against escape; the rings 24 also serving as wear rings. In order to remove the earth working rings 19 for replacement or repair the screws 23 are loosened, permitting of ready removal of the corresponding flange 21 and ring 24, whereupon the rings 19 can be slid on or off of the cylinder 1.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. In a roller unit which includes a transversely extending cylinder having heads secured in opposite end portions thereof, and spindle supporting bearing assemblies mounted on each head with the spindles projecting axially outwardly; an attachment bracket corresponding to each spindle and adapted for connection to a draft frame, and means detachably connecting each bracket to the corresponding spindle; said means comprising an attachment head having a taper socket centrally therein, the outer end of the spindle being tapered and seating in said socket, the bracket and head having flat, engaged faces, a tie bolt extending through the engaged bracket and head and threaded axially into the spindle, and means to prevent relative rotation between the bracket and head.

2. A roller unit as in claim 1 in which said last named means comprises a cooperating pin and socket assembly between the bracket and head.

THEODORE G. SCHMEISER.